Dec. 26, 1950 M. CAMRAS Re. 23,311

METHOD OF AND MEANS FOR NEUTRALIZING INDUCTIVE DISTURBANCES IN MAGNETIC REPRODUCERS

Original Filed Nov. 18, 1942

Inventor

MARVIN CAMRAS.

By Charles W. Hills Atty.

Reissued Dec. 26, 1950 Re. 23,311

UNITED STATES PATENT OFFICE 23,311

METHOD OF AND MEANS FOR NEUTRALIZING INDUCTIVE DISTURBANCES IN MAGNETIC REPRODUCERS

Marvin Camras, Chicago, Ill., assignor to Armour Research Foundation of Illinois Institute of Technology, a corporation of Illinois Original No. 2,351,008, dated June 13, 1944, Serial No. 465,967, November 18, 1942. Application for reissue January 12, 1949, Serial No. 70,567

2 Claims. (Cl. 179—100.2)

1 2

Matter enclosed in heavy brackets [ ] appears in the original patent but forms no part of this reissue specification; matter printed in italics indicates the additions made by reissue

This invention relates to improvements in a method of and means for neutralizing inductive disturbances in a magnetic reproducing or magnetic recording device so that only the inductive impulses created by a magnetized recording medium will be amplified and reproduced, while inductive disturbances resulting from stray magnetic fields in the vicinity of the reproducing element or initial pick-up element will be neutralized and balanced out, whereby fidelity of reproduction is maintained.

The invention is highly desirable for use in connection with a magnetic recording and reproducing device wherein sound is recorded by magnetizing an elongated recording medium such as a paramagnetic tape or paramagnetic round wire. Frequently the recording device may also be used as a reproducing device to reproduce what has been magnetically recorded on the elongated medium. In other cases, one may be used for reproduction only. The instant invention is designed to make that reproduction of greater fidelity by the neutralizing of inductive disturbances resulting from stray magnetic fields.

In such a magnetic reproducing device, there is usually an amplification circuit, a driving motor, power transformer, and other electrical elements used in the various circuits, such as a choke coil, each of which may provide a stray magnetic field which will also induce a voltage in addition to the voltage induced by the recording medium itself. While such stray fields will theoretically resolve into a single resultant stray field, such resultant stray field is not always of the same magnitude nor in the same direction, since other stray fields from various electrical appliances or devices operating in the vicinity of the magnetic reproducer will likewise induce voltages in the pick-up elements, and these other devices may be turned on and off at indeterminate times, so that the ultimate resultant field in most cases is continuously fluctuating as to both direction and magnitude. Consequently, in a magnetic record player, wherein the input magnet or pick-up magnet is designed to respond to minute magnetic variations along a fine wire or other elongated recording medium, the stray hum pick-up may at times be even greater than the signal voltage from the wire. Of course, there are two remedies for stray hum pick-ups. One is to enclose the magnetic input device or pick-up device in a shield, but this remedy is extremely costly if done effectively. Second, the magnetic pick-up device or input device might be oriented until the hum pick-up is at a minimum but this will not eliminate the hum pick-up from stray magnetic fields completely except under certain special conditions which very rarely occur in practice, namely, a single "point" source of alternating current magnetic fields, or several sources which give the fundamental components all in time phase, and harmonic components also in time phase and in the same direction as the fundamental components. With a resultant field that varies continuously as to both direction and magnitude, it is substantially impossible to orient the reproducing magnet to reduce the hum pick-up.

In addition, it may be mentioned that the above two methods are not always practical with certain types of magnetic record playing devices for mechanical and practical reasons. For example, where the same magnet device is used to magnetize a wire or other elongated recording medium, and then later used as the pick-up magnet for reproducing a recording previously made on that medium, it is not feasible to change the position of this magnet device, because the travel of the wire through the machine is along a substantially fixed path.

With the foregoing in mind, it is an important object of the present invention to neutralize inductive disturbances resulting from stray magnetic fields in a magnetic reproducer having a pick-up magnet located in a fixed position, and without effectively shielding the magnet.

Another object of the invention resides in the neutralization of inductive disturbances resulting from stray magnetic fields in a magnetic reproducer by the introduction of an auxiliary coil in series with the pick-up or input magnet; or, if so desired, the auxiliary coil may be in parallel with the input or pick-up magnet.

Another object of the invention is the elimination of hum pick-up in a magnetic reproducer by the utilization of an auxiliary coil of approximately the same size and construction as the pick-up magnet, and orienting the auxiliary coil relatively to the pick-up magnet so as to balance out induced voltages from stray fields.

A further feature of the invention resides in the provision of an auxiliary coil in the input amplification circuit of a magnetic reproducer to balance out inductive disturbances resulting from stray magnetic fields.

Still another feature of the invention resides in the introduction of an auxiliary pick-up coil in a location in close proximity to the input or pick-up magnet of a magnetic reproducer, for the purpose of balancing out disturbances from stray magnetic fields.

A further feature of the invention resides in the provision of a hum reducing arrangement including the use of an auxiliary pick-up device in a region where the magnetic field is substantially an image of the field near the major pick-up device in respect to stray field conditions, and orienting the auxiliary pick-up device so as to neutralize the inductive effects of the stray field.

A further object of the invention is the provision of a new and novel method of eliminating, neutralizing, or balancing out the inductive disturbances resulting from stray magnetic fields, in connection with a magnetic reproducing device.

While some of the more salient features, characteristics and advantages of the instant invention have been above pointed out, others will become apparent from the following disclosures, taken in conjunction with the accompanying drawing, in which.

As shown on the drawing.

Figure 1:
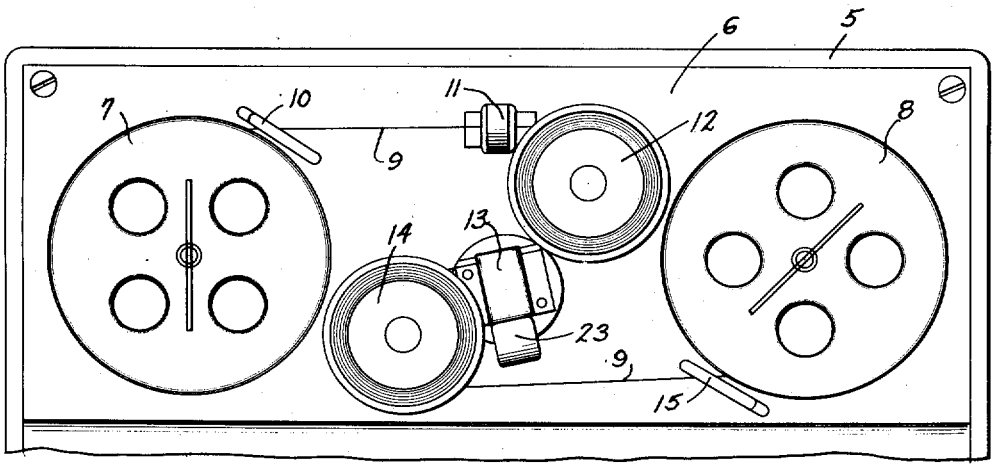
Figure 1 is a fragmentary front elevational view of a magnetic recording and reproducing device, equipped with means embodying the principles of the instant invention and incorporating the practice of my novel method in its use.

The illustrated embodiment of the instant invention is shown associated with a magnetic recording and reproducing device including a cabinet or other supporting structure 5 having a front panel 6 carried thereby. All of the operating equipment of the recording and reproducing device which need be described herein may be carried or supported by the panel 6.

Near one side of the panel a reel or spool 7 is rotatably mounted, and near the opposite side a similar reel 8 is rotatably mounted. These reels may be operated in both directions so as to wind a recording medium backward and forward therebetween in either direction. In the present instance, the recording medium is shown in the form of a very fine round wire 9, which may be of approximately the size of a human hair, .004 or .005 inch in diameter being satisfactory.

With the illustrated recording and reproducing device, the recording medium or wire 9 travels from reel 7 to reel 8 during the making of a recording, or during the magnetization of the wire itself in keeping with variations in the sound of the production being recorded upon the wire. After a recording has been made, the wire may be rewound off reel 8 onto reel 7, and during this rewinding operation nothing happens to the wire or the recording thereof. The wire may be then moved in the forward direction, namely from reel 7 to reel 8, and the recording on the wire reproduced audibly by means of a suitable inductive pick-up and amplifying circuit, utilizing the same magnet as a pick-up magnet for reproduction that initially magnetized the wire during recording. Obviously, other circuits will be involved inside the device for reproduction, and the instant invention centers itself mainly in the reproduction operation of the device. It is not essential that the device be made to both record and reproduce, but such is a convenient form.

As the wire travels from reel 7 to reel 8 it first passes through a level wind element 10 associated with reel 7, thence through an erasing head 11 designed to demagnetize the wire, around a guide pulley 4, through a recording head in a housing 13, around another guide pulley 14, through a level wind arrangement 15, and onto reel 8.

Figure 2:
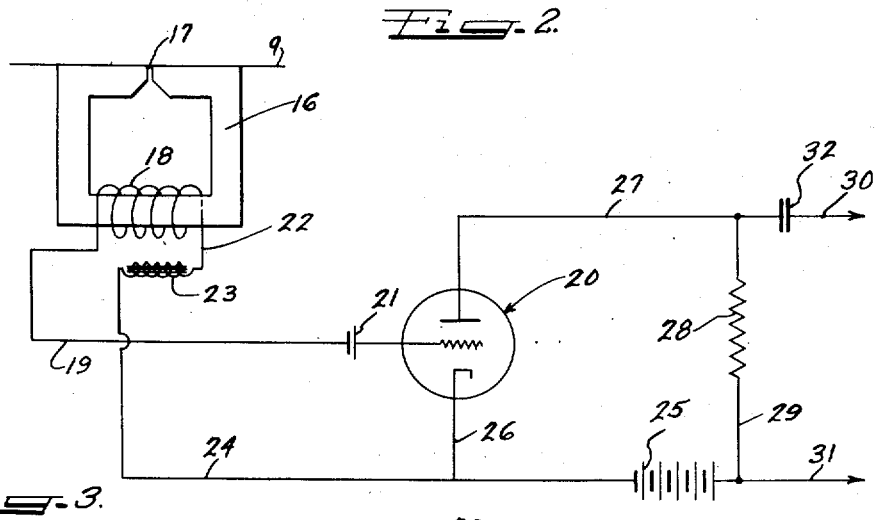
Figure 2 is a simplified diagram of the input portion of the amplifying circuit embodied in the device of Figure 1, and also including principles of the instant invention.

During a reproduction from a wire previously magnetized, the erasing head 11 does not function, and the recording head in the casing 13 acts as the reproducing or pick-up magnet which may for convenience be termed the input magnet of the amplifying circuit. With reference to Figure 2, it will be seen that this input magnet includes a paramagnetic core 16, preferably laminated, having a relatively minute air gap 17 to establish in effect pole pieces of opposite polarity on each side of the air gap. Around one portion of the core 16 a winding or coil 18 is positioned. It will, therefore, be seen that during a reproduction, as the wire 9 passes over or through a slot in the pole pieces on each side of the air gap 17, the magnetization on this wire will induce a voltage in the coil 18, and this induced voltage will vary in accordance with the varying magnetization of the wire.

Other voltages from stray magnetic fields in the vicinity will also be induced in the coil 18, and in view of the fact that this coil is connected in the input portion of the amplifying circuit, it is desirable to neutralize or balance off the effect of the induced voltage from stray fields, and such is efficiently accomplished by the instant invention.

With reference to Figure 2, it will be seen that the coil 18 is connected at one end through a conductor 19 to the grid of an amplifying tube 20 which is diagrammatically illustrated as a triode, whereas in practice, a pentode including both screen and suppressor grids would probably be used, since this tube forms the first stage of amplification. A uni-cell battery 21 may be inclined in the conductor 19 as a grid bias. The other end of the coil 18 is connected through a conductor 22 to a coil 23 which is in the form of an auxiliary pick-up coil and preferably is approximately the same construction and the same number of turns as the coil 18. In this illustrated instance, the auxiliary pick-up coil 23 is in series with the coil 18, and the opposite end of the coil 23 is connected through a conductor 24 to a source of energy such as a battery 25. The cathode of the tube 20 may be connected through conductor 26 to the conductor 24. The plate of the tube 20 is connected through conductor 27 to a load resistance 28 which in turn is connected as indicated at 29 to the opposite side of the battery 25. Thus, we have a simplified input portion of an amplifying circuit, including the first stage of amplification, and further stages of amplification may be connected as indicated by extended conductors 30 and 31, a condenser 32 preferably being included in the conductor 30.

In operation, the pick-up coil 18 will not only have a voltage induced therein by virtue of the magnetized wire 9, but will also have another varying voltage induced by the resultant of stray magnetic fields. These stray magnetic fields may originate in a power transformer, driving motor, choke coil, and similar apparatus used in the magnetic reproducing device itself. Likewise, there may be additional stray fields from electrical apparatus operated in the vicinity of the magnetic reproducing device. If the resultant of all these stray fields was constant, the pick-up or input magnet still could not be oriented effectively because by virtue of the travel of the wire 9, this magnet must remain substantially in fixed position.

The auxiliary pick-up coil is, therefore, used, and this coil is preferably placed as closely as possible to the coil 18 so as to be in a region of stray magnetic fields which is an image of the region in which the coil 18 is located. As seen in Figure 1, the coil 23 is positioned as closely as possible to the coil 18, this being the preferable location. With such positioning, any voltage induced by a stray field in the coil 18 will likewise be induced by the same field in the coil 23, and the resultant stray field will have the same effect on the coil 23 as it does on the coil 18, and will be of the same magnitude and the same direction as to both coils.

The coil 23 is oriented to cancel or balance out the voltages induced from stray fields, and this orientation may be by opposite connection, opposite winding, or in some other suitable manner. In the illustrated instance, the coil 23 is oppositely wound to the coil 18, and, therefore, the voltages induced by stray fields in the coil 23 will be in opposition to the voltages induced by the same stray fields in the coil 18, and thus there is a balancing out of all inductive disturbances resulting from stray fields. The voltage induced in the coil 18 by the magnetized wire or recording medium will not be induced in the coil 23 by virtue of its position, so the result will be a true and accurate amplification of the inductive impulses from the magnetized recording medium alone, namely, fidelity of reproduction without any hum or other noise resulting from stray field disturbances.

Of course, voltages induced in the coil 18 by the magnetized recording medium will disrupt the bias on the grid of the tube 20, amplification of these impulses will result, and the amplification may be reproduced at audio frequency through a loud speaker, all in a manner known to those skilled in the art.

Figure 3:
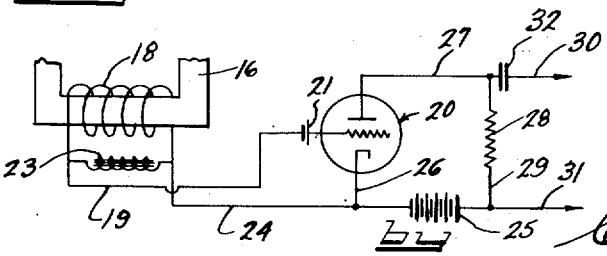
Figure 3 is another simplified diagram of the same portion of the amplifying circuit as Figure 2, but illustrating a different connection for the auxiliary pick-up coil.

The coil 23 does not of necessity have to be connected in series with the pick-up or input coil 18. In Figure 3, I have illustrated substantially the same simplified diagrammatic showing of an input portion of the amplifier circuit as is illustrated in Figure 2. The same reference numerals have been used to designate like parts, but in this instance the conductor 22 is eliminated, and conductor 24 runs direct from the battery to one side of the pick-up or input magnet coil 18. The auxiliary pick-up coil 23 is shown connected between conductors 19 and 24, in parallel with the coil 18. With this arrangement, it will be seen that the hum balancing or auxiliary pick-up coil 23 is in a region of stray fields which is the exact image of the region of stray fields occupied by the coil 18. Again, the coil 23 is oriented by being wound oppositely to the coil 18, so that voltages induced by stray fields in the coil 18 will be neutralized by equal and opposite voltages induced by the same stray fields in the coil 23.

My novel method of neutralizing inductive disturbances in a magnetic reproducing device is believed sufficiently apparent from the foregoing as not to warrant further detailed description herein.

From the foregoing, it is apparent that I have provided novel means and a novel method of neutralizing or balancing out inductive disturbances occurring in the input circuit of a reproducing device. It is apparent that by the aid of an auxiliary coil, properly oriented, and arranged to oppose stray pick-up of the magnetic input device, inductive disturbances resulting from stray magnetic fields may be balanced out of the magnetic input device, leaving only the effect of the intended and proper magnetic field to be amplified. It is further apparent that my novel arrangement is simple in construction, and extremely economical to incorporate in a magnetic reproducing system and to operate.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

[1. In a device for reproducing magnetic recordings, an input magnet responsive to magnetic variations along an elongated recording medium, said magnet having a coil, and an auxiliary pick-up coil connected in circuit with the magnet coil and arranged to substantially neutralize the effect of stray voltages induced in the magnet coil regardless of the general location of said device.]

2. In a magnetic reproducing device, a panel, a pair of spaced reels thereon, an elongated recording medium on said reels, a reproducing head including an electromagnet [between said reels in the path of said recording medium] *having a pair of poles spaced longitudinally of said medium and both on the same side thereof and across which said medium travels* and a pick-up coil on said panel immediately adjacent the coil of said electromagnet in *permanent* circuit connection therewith and orientable to substantially neutralize the effects of stray voltages induced in said electromagnet regardless of the general location of said device.

[3. The method of neutralizing inductive disturbances in a pick-up magnet for a reproducer of magnetic recordings, including the step of setting up a reactionary inductance by an induction coil located in a region of stray magnetic fields which is an image of the stray magnetic region of said pick-up magnet and orienting said induction coil with respect to said pick-up magnet to balance out the effects of a particular stray magnetic field region of the pick-up magnet depending upon the location of the apparatus.]

[4. In a device for reproducing magnetic recordings, an input magnet responsive to magnetic variations along an elongated recording medium, said magnet having a coil, and a hum bucking coil connected in circuit with and disposed adjacent said magnet coil and orientable to substantially neutralize the effects of inductive disturbances in said magnet caused by sources foreign to said device and apparatus connected therewith.]

[5. The method of neutralizing inductive disturbances in a pick-up magnet for a reproducer of magnetic recordings caused by stray fields from sources external to the reproducer and its associated apparatus, including the steps of setting up an opposing inductance by an induction coil in circuit with said pick-up magnet, and orienting said coil to balance out the effects of said stray fields.]

6. *In a device for reproducing magnetic recordings, an input magnet responsive to magnetic variations along a path of movement of a recording medium, said magnet having a pair of poles spaced longitudinally of said path of movement of said recording medium with both poles on the same side thereof and across which said medium travels, said magnet also having a coil with a straight axis, and a second pick-up coil with a straight axis of approximately the same size and construction as said first mentioned coil and connected in circuit with said first mentioned coil and positioned with its said*

*axis parallel to and laterally spaced alongside of said axis of said first mentioned coil, said coils being immediately adjacent each other in side-by-side relationship said second mentioned coil being connected to said first mentioned coil at all times to substantially neutralize the effect of stray voltages induced in said first mentioned coil regardless of the location of said device.*

MARVIN CAMRAS.

REFERENCES CITED

The following references are of record in the file of this patent or the original patent:

FOREIGN PATENTS

| Number | Country | Date |
|---|---|---|
| 457,282 | Germany | Mar. 13, 1928 |
| 622,623 | Germany | Dec. 2, 1935 |